(12) United States Patent
Walter et al.

(10) Patent No.: US 10,899,623 B2
(45) Date of Patent: Jan. 26, 2021

(54) CATALYTICALLY ACTIVE ADDITIVES FOR COKE ORIGINATING FROM PETROL OR COAL

(71) Applicant: SGL CARBON SE, Wiesbaden (DE)

(72) Inventors: Heribert Walter, Meitingen (DE); Wilhelm Frohs, Allmannshofen (DE); Johann Daimer, Mörfelden-Walldorf (DE); Martin Christ, Meitingen (DE); Oswin Öttinger, Meitingen (DE); Bernt Ketterer, Meitingen (DE); Ivano Galbiati, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 0 days.

(21) Appl. No.: 16/072,938

(22) PCT Filed: Jan. 27, 2017

(86) PCT No.: PCT/EP2017/051818
§ 371 (c)(1),
(2) Date: Jul. 26, 2018

(87) PCT Pub. No.: WO2017/129774
PCT Pub. Date: Aug. 3, 2017

(65) Prior Publication Data
US 2019/0031514 A1    Jan. 31, 2019

(30) Foreign Application Priority Data

Jan. 29, 2016   (DE) .................... 10 2016 201 430

(51) Int. Cl.
| | | |
|---|---|---|
| C01B 32/205 | (2017.01) | |
| C01B 32/21 | (2017.01) | |
| H01M 4/587 | (2010.01) | |
| H01M 4/583 | (2010.01) | |
| C10B 55/02 | (2006.01) | |

(52) U.S. Cl.
CPC ............ *C01B 32/205* (2017.08); *C01B 32/21* (2017.08); *C10B 55/02* (2013.01); *H01M 4/583* (2013.01); *H01M 4/587* (2013.01); *C01P 2002/54* (2013.01); *C01P 2002/72* (2013.01); *C01P 2002/77* (2013.01); *C01P 2004/61* (2013.01); *C01P 2006/40* (2013.01)

(58) Field of Classification Search
None
See application file for complete search history.

(56) References Cited

U.S. PATENT DOCUMENTS

| | | |
|---|---|---|
| 702,758 A | 6/1902 | Acheson |
| 4,334,980 A | 6/1982 | Hsu |
| 5,419,889 A | 5/1995 | Matsumoto |
| 2010/0209331 A1 | 8/2010 | Sakamoto et al. |
| 2011/0044881 A1 | 2/2011 | Stansberry et al. |
| 2014/0349173 A1 | 11/2014 | Ishii et al. |
| 2015/0263348 A1 | 9/2015 | Wakizaka et al. |

FOREIGN PATENT DOCUMENTS

| | | |
|---|---|---|
| DE | 69718327 T2 | 10/2003 |
| DE | 10244351 A1 | 4/2004 |
| EP | 0274165 A1 | 7/1988 |
| EP | 0918040 A1 | 5/1999 |
| JP | S63-79759 A | 4/1988 |
| JP | 2015-164127 A | 9/2015 |
| KR | 10-2012-0064685 A | 6/2012 |

OTHER PUBLICATIONS

International Search Report and Written Opinion of the International Search Authority dated Apr. 21, 2017 of corresponding International application No. PCT/EP2017/051818; 9 pgs.
Rodriguez et al., "Graphitized boron-doped carbon foams: Performance as anodes in lithium-ion batteries", Electrochimica Acta, vol. 56, 2011, pp. 5090-5094.

*Primary Examiner* — Guinever S Gregorio
(74) *Attorney, Agent, or Firm* — Maier & Maier, PLLC

(57) ABSTRACT

The invention relates to a method for producing graphite materials as well as the use thereof in lithium ion batteries.

13 Claims, No Drawings

CATALYTICALLY ACTIVE ADDITIVES FOR COKE ORIGINATING FROM PETROL OR COAL

FIELD

The invention relates to a method for producing graphite materials as well as the use thereof in lithium-ion batteries.

BACKGROUND

Petroleum-based or coal-based cokes which are produced, for example, with the aid of a delayed coker can be used for producing graphite materials. In this case, petroleum residues, coal tar pitches, or the residues from coal gasification, coal hydrogenation, or even Fischer-Tropsch synthesis are processed into cokes. The delayed coker relates to a conversion process used in crude oil refinement in which long-chain, viscous residues are coked (delayed coking process). Very heavy oils which occur in crude oil processing as a residue, a vacuum residue (slurry oil, decanting oil, thermal, or ethylene tar), coal tar pitch, and residues from coal gasification, coal hydrogenation and/or residues from Fischer-Tropsch synthesis (waxy oils) are liquid or pasty at room temperature, or they have very low softening temperatures, and therefore an implementation using the addition of additives does not present an obstacle for a skilled person.

The delayed coker essentially consists of two units, a continuous flow furnace (coker furnace) and the alternating application of two coker drums. The residues are heated to about 450-550° C. in a continuous flow furnace.

The cokes thus obtained can be calcinated and are able to be transformed into synthetic graphite by means of further thermal treatment at greater than 2200° C.

One traditional technological method is the Acheson graphitisation process (U.S. Pat. No. 702,758). The furnace consists of a horizontal bed made of fireproof materials, furnace heads which carry the feedstock to the furnace, and long sidewalls manufactured from concrete blocks, steel plates, or steel mesh. The bottom is cooled with air and packed with a layer of insulating materials such as granular silicon carbide, metallurgical coke, sand, or sawdust. The same materials are used to insulate the sidewalls and the surfaces of the furnace. Soot is used as an insulating material particularly when a graphite product having a lower ash content is desired. The material to be graphitised is normally layered horizontally between the furnace heads in a direction perpendicular to the flow of electric current. Acheson furnaces are solid structures which are well suited to graphitisation in all of its forms. Less satisfactory is the high proportion of inert material, long heating and cooling periods that can lead to a production period of approximately 2 to 6 weeks for graphitising one batch, the correspondingly high energy demand, and the inhomogeneity of the product.

An additional system for graphitising in a horizontal position using current flowing directly through the material to be graphitised is the Castner furnace, which is currently quite common in industrial facilities (DE10244351A) because the direct input of energy generally consumes less energy, thus enabling significantly shorter processing periods of only a few days.

One additional technological method is fluidised bed graphitisation (EP027416561) which is, for example, used for purifying cokes that will be further used as raw materials. In this method as defined by Desulco®, a granulation is sustained by means of a fluidised bed. The bulk material direction is from top to bottom via gravity, a stream of nitrogen being guided against the direction of the bulk material. A fluidised bed is arranged at a constriction in the reactor. Depending on the type of arrangement, the dwell time of the coke may be only a few seconds.

High local temperatures occur as a result of micro-arcing between the individual particles, grains, or granules. The temperature is not measurable. A large discharge of fine material and combustible gases in a volatile post-combustion process prevents the emission of cleavage products. Significant disadvantages of this method include the very brief reaction time described and a relatively low degree of graphitisation, which is hardly suitable for the production of, for example, anode materials for lithium ion batteries.

Fischer-Tropsch synthesis is a large-scale method used for coal liquefaction. This takes place by means of heterogeneous catalytic conversion of synthesis gas, which is a mixture of carbon monoxide and hydrogen, into a broad range of hydrocarbons in liquid and gaseous form. Another large-scale method is the Bergius method, in which hydrocarbons are formed by hydrogenating coal and hydrogen in an exothermic reaction.

Along with lithium, these graphite materials can be used as lithium intercalation materials in anode materials for lithium ion batteries. Reliable cells having a good cycling efficiency can be produced as a result.

Cycling efficiency describes the Coulombic efficiency spanning a given number of charging and discharging cycles. The Coulombic efficiency is the ratio between the number of charges that leave the battery during discharge and the number that enter it during the charging process.

In patent application US2014/0349173A1, catalysts such as iron, nickel, titanium, silicon, and boron as well as carbides and oxides thereof are used for Acheson graphitisation (page 4, paragraph [0062]). An improved degree of graphitisation is achieved by means of these catalysts.

However, disadvantages of this method include substantial quantities of catalyst (between 3 and 30 wt. %) as well as inhomogeneous distribution of the catalyst. Regarding larger coke particle sizes in particular, the catalysts mixed in the binder phase are present on the surface of the coke particles and are not, therefore, homogeneously distributed.

The object of the invention is to provide a homogeneous distribution of the catalyst in the individual coke grains.

SUMMARY

This object will be achieved by means of a method for producing graphite materials, comprising the following steps:

a) addition of at least one catalyst which is effective for catalytic graphitisation and is selected from at least one compound of oxides and carbides from the group including the elements iron, nickel, titanium, silicon, and boron to petroleum residues, coal tar pitch, and/or the residues from coal gasification, Fischer-Tropsch synthesis, or coal hydrogenation in a delayed coker;

b) production of the doped green coke in the delayed coker;

c) calcination of the doped green coke obtained in step b) at 1100-1400° C. to form a doped and calcinated coke;

d) mechanical comminution of the doped and calcinated coke;

e) shaping a green body made of the doped and calcinated coke from step d) along with a binder additive followed by carbonisation of the green body at 600-1400° C.;

f) graphitisation of the carbonised green body from step d) at temperatures of greater than 2600° C., preferably greater than 2800° C., and particularly preferably greater than 3000° C. using the Acheson or the Castner graphitising process or by means of either continuous or batch powder graphitisation of the powder from step d);

g) grinding of the body from step e).

In the context of the invention, the term "green coke" is understood to mean a coke produced in and discharged from a delayed coker. The term "doped" is understood to mean that the coke contains a homogeneously distributed catalyst. Calcination is a thermal treatment of the doped green coke at 1100 to 1400° C. in order to liberate residual volatile hydrocarbons. By means of this method, the catalyst content can be reduced by at least 50%, the term "catalyst content" being understood in the context of this invention to mean the proportion of catalyst with respect to the starting materials.

A homogeneous distribution of the catalyst is achieved by means of the method according to the invention because the catalyst is added to the liquid starting materials in the delayed coker. Moreover, the quantity of catalyst can be reduced to a maximum of 15 wt. % with respect to the educts, as a result of which the action of the catalyst is enhanced. Due to a homogeneous distribution of the catalyst in the coke, use of the green coke doped with a catalyst in the production of graphite products only requires a limited amount of binder, preferably 2-10 wt. %, in comparison with a heterogeneous distribution. In addition, due to the limited amount of binder, fewer volatile components need to be expelled, so a product having greater purity is more easily obtained. Expelling the volatile components in the binder and catalyst takes place during the method step involving the high-temperature treatment of the graphitisation process.

Furthermore, so-called coarse recipes are able to be used as a result of this method. The term "coarse recipes" is understood to mean that the formulation of the coke consists of coarser components having $d_{50}$ values of from 100 μm to 20 mm. This has the advantage of the green bodies produced using coarse recipes being able to be carbonised and graphitised more quickly and easily since coarse recipes require a significantly lower proportion of binder.

Moreover, continuous powder graphitisation methods using doped coke according to the invention are able to provide graphite having a high degree of graphitisation.

The degree of graphitisation is a characteristic value which describes the interlayer distance. In an ideal graphite, the interlayer distance is $d_{002}$ 0.3354 nm, which corresponds to a degree of graphitisation of 1. According to the definition, a degree of graphitisation of 0 corresponds to an interlayer distance of 0.344 nm (as per Maire and Mehring). It is known from the literature (see, for example, C. L. Fan et al., Electrochimica Acta 75(2012), 311-315) that the discharging capacity of graphite in lithium ion batteries increases almost linearly with the degree of graphitisation. In this context, the maximum theoretical discharging capacity of ideal graphite is 372 mAh/g.

Advantageously, the catalyst from step a) is at least one compound selected from the group including $SiC$, $SiO_2$, $Fe_2O_3$, or $TiO_2$.

Advantageously, the doped and calcinated coke from step c) comprises a maximum of 15 wt. % catalyst, preferably 1-10 wt. % catalyst, and particularly preferably 1-5 wt. % catalyst. Further positive effects do not occur with more than 15 wt. % catalyst, and, with less than 1 wt. %, the amount of catalyst used is insufficient for catalytic graphitisation.

Advantageously, during the production of the green body in step e), the doped and calcinated coke has a grain size larger than 100 μm, preferably from 1 to 20 mm. Production of the green body is made more difficult at grain sizes smaller than 100 μm and larger than 20 mm. The grain sizes of the doped and calcinated coke are determined using sieve analysis (DIN I 66165-2016; method F).

Advantageously, in the event of shaped body graphitisation, the graphitisation in step f) is the Castner method and, in the event of powder graphitisation, it is continuous powder graphitisation.

In a further preferential embodiment, the powder from step d) is additionally mixed with less than 50 wt. % natural graphite, preferably 10 to 30 wt. %, prior to shaping. The advantage of using natural graphite consists of increasing the density of the green body. The use of more than 50 wt. % complicates production of the green body, and the positive effects of natural graphite do not occur at less than 10 wt. %.

Advantageously, the binder in step e) used for shaping the green body is selected from the group consisting of coal tar pitch, bitumen, phenolic resin, furan resin, or any desired mixtures thereof.

In a further preferential embodiment, a catalyst is additionally mixed in with the binder used in step e). This has the advantage of catalyst being present in both the coke grains and in the binder such that a homogeneous mixture of catalyst is present throughout the entire mixture.

Advantageously, the additional catalyst is selected from at least one compound of oxides and carbides from the group including the elements iron, nickel, titanium, silicon, and boron and constitutes, based on the binder portion, a maximum of 15 wt. %. Further improvements do not occur with a catalyst portion of greater than 15 wt. % based on the binder portion.

The following mixtures are preferential with respect to the doping:

a) doped and calcinated coke with binder b) doped and calcinated coke with binder having an additional catalyst c) doped and calcinated coke with natural graphite and binder d) doped and calcinated coke with natural graphite and binder having an additional catalyst Advantageously, the graphitisation is carried out at temperatures greater than 2600° C., preferably greater than 2800° C., and particularly preferably greater than 3000° C. Doing so ensures that the catalyst is expelled and achieves a greater degree of graphitisation of from 0.90-1.0 for the synthetic graphite. In the context of the invention, the degree of graphitisation is determined according to Maire and Mering (J. Maire, J. Mering, Chemistry and Physics of Carbon, vol. 6, Marcel Dekker, 1970, pp. 125 ff.).

Following graphitisation, the graphite material advantageously exhibits a discharge capacity of from 345 to 365 mAh/g, preferably 355 to 365 mAh/g. In the context of the invention, test cells are assembled in a 2016 button cell format and connected to a galvanostatic battery cycler in order to measure the discharge capacity (Qe) of the carbon-based anode materials. In this case, the cell is charged at a constant current (CC) and at a C-rate of 0.1 C (1 C corresponds to the current necessary for the cell to be fully charged in 1 hour) up to a cut-off voltage of 0 V, with a cut-off current having to be achieved at C/50 given a constant potential (CV=constant voltage). The cell is in turn subsequently discharged at a constant current until reaching a voltage of 1.5 V and a C-rate of 0.1 C. The discharge capacity Qe is calculated in this case by dividing the determined charge quantity (in mAh) by the specific anode mass.

The graphite material according to invention is to be used as anode material in lithium ion batteries.

DETAILED DESCRIPTION

The following embodiments serve to further clarify the invention, in which context these embodiments do not represent a limitation on the invention.

Embodiment 1

Coal tar pitch with a softening point of 60° C. is heated to 150° C., thus transforming into a liquid state. SiC powder having a $d_{50}$ value of 50 μm is added to this molten mass. Having been mixed with the catalyst, this dispersion is continuously added into the delayer coker from above.

In terms of procedure, it is simplest for the base substance (in this case the coal tar pitch) of the dispersion into which the catalyst has been mixed to be a portion of the flow of feedstock entering the delayed coker.

Following the delayed coking process, the material is broken up and calcinated at 1300° C.

Having been doped with SiC and calcinated, the coke was subjected to an ash analysis and measured an SiC content of approximately 5 wt. %.

The doped and calcinated coke, which had a maximum granulation of 3 mm, was mixed with 20 wt. % coal tar pitch (binder) having a softening point of 90° C. and shaped by means of extrusion (90 mm diameter).

The rod-shaped material was subsequently carbonised and graphitised in a Castner furnace at 2800° C. The graphite material was then further processed into an anode material powder having a d50 grain size of 20 μm.

The d50 value indicates the median particle size, in which case 50% of the particles are smaller than the specified value. Diameters falling within this range are determined using laser light diffraction (ISO 13320-2009).

The powder was subjected to an ash analysis, and the Si content was determined to be less than 100 ppm.

X-ray analysis of the powder returned a $d_{002}$ value of 0.3359 nm, and the apparent crystallite size had an Lc value of 170 nm. The degree of graphitisation is surprisingly high at 0.94.

The anode powder was subsequently tested in a battery cell test using a half-cell configuration, meaning that metallic lithium was used as the counter electrode. Following the formation cycle, the discharge capacity at a cycling rate of C/10 was determined to be 360 mAh/g. This represented a very good result and one close to the theoretical capacity of 372 mAh/g.

Embodiment 2

Coal tar pitch with a softening point of 60° C. is heated to 150° C., thus transforming into a liquid state. SiC powder having a d50 value of 50 μm is added to this molten mass. Having been mixed with the catalyst, this dispersion is continuously added into the delayer coker from above.

In terms of procedure, it is simplest for the base substance (in this case the coal tar pitch) of the dispersion into which the catalyst has been mixed to be a portion of the flow of feedstock entering the delayed coker.

Following the delayed coking process, the material was broken up and calcinated at 1300° C.

Having been doped with SiC and calcinated, the coke was subjected to an ash analysis and measured an SiC content of approximately 5 wt. %.

The doped and calcinated coke, which had a maximum granulation of 3 mm, was mixed with 20 wt. % coal tar pitch (binder) having a softening point of 90° C., with 5 wt. % catalyst (SiC) being mixed into the binder and shaped by means of extrusion (90 mm diameter).

The rod-shaped material was subsequently carbonised and graphitised in a Castner furnace at 2800° C. The graphite material was then further processed into anode material powder having a d50 grain size of 20 μm. The d50 value indicates the median particle size, in which case 50% of the particles are smaller than the specified value.

Diameters falling within this range are determined using laser light diffraction (ISO 13320-2009).

The powder was subjected to an ash analysis, and the Si content was determined to be less than 100 ppm.

X-ray analysis of the powder returned a $d_{002}$ value of 0.3357 nm, and the apparent crystallite size had an Lc value of 200 nm. The degree of graphitisation is surprisingly high at 0.95.

The anode powder was subsequently tested in a battery cell test using a half-cell configuration, meaning that metallic lithium was used as the counter electrode. Following the formation cycle, the discharge capacity at a cycling rate of C/10 was determined to be 362 mAh/g. This represented a very good result and one close to the theoretical capacity of 372 mAh/g.

Comparative Example A (Prior Art)

In this example, graphite was produced in a way similar to embodiment 1. The difference consisted mainly of no catalyst (SiC) having been added while producing the coke.

X-ray analysis of the powder returned a $d_{002}$ value of 0.3365 nm and an Lc value of 100 nm. The degree of graphitisation thus measured 0.87. The median discharge capacity in the lithium ion cell test, similarly to example 1, was 337 mAh/g.

Comparative Example B (Prior Art)

Similarly to comparative example A, no catalyst was added in the coke production process for this comparative example. In the green recipe, however, only SiC powder was added to the binder pitch. Three mixtures were tested in this case, the ratios of which are summarised in table 1.

TABLE 1

| Mixtures | Discharge capacity in mAh/g |
|---|---|
| 5 wt. % SiC/75 wt. % coke/20 wt. % pitch | 345 |
| 10 wt. % SiC/70 wt. % coke/20 wt. % pitch | 350 |
| 15 wt. % SiC/64 wt. % coke/21 wt. % pitch | 360 |

All of these recipes were processed and analysed in a way similar to example 1. The discharge capacities indicated in table 1 were determined in the cell test.

As a comparison of the results from embodiment 1 and comparative example B shows, good discharge capacities are obtained in comparative example B only when the catalyst content is very high.

By adding the graphitisation catalyst both to the coke and to the binder pitch (see embodiment 2), a homogeneous distribution of catalyst is achieved throughout the entire material, as a result of which the discharge capacity is further increased.

Therefore, graphite production using the doped coke exhibits surprising advantages with respect to both performance and cost which are achieved by a more efficient introduction of the graphitisation catalyst material and a higher process speed for carbonisation and graphitisation.

The invention claimed is:

1. A method for producing graphite materials, comprising the following steps:
   a) adding of at least one catalyst, which is effective for catalytic graphitisation and is selected from at least one compound of oxides and carbides from the group including the elements iron, nickel, titanium, silicon, and boron, to petroleum residues, coal tar pitch, and/or residues from coal gasification, Fischer-Tropsch synthesis, or coal hydrogenation in a delayed coker;
   b) producing of the doped green coke in the delayed coker, the doped green coke containing a homogeneously distributed catalyst;
   c) calcination of the doped green coke obtained in step b) at 1100-1400° C. to form a doped and calcinated coke;
   d) mechanical comminution of the doped and calcinated coke;
   e) shaping a green body made of the doped and calcinated coke from step d) along with a binder additive followed by carbonisation of the green body, graphitisation of the carbonised green body at temperatures of greater than 2600° C. using the Acheson or the Castner graphitising process and then grinding of the body;
   or
   graphitization by means of either continuous or batch powder graphitisation of the powder from step d).

2. The method for producing graphite materials according to claim 1, wherein at least one compound selected from the group including SiC, SiO2, Fe2O3, or TiO2 is selected as the catalyst in step a).

3. The method for producing graphite materials according to claim 2, wherein the calcinated and doped coke from step b) contains a maximum of 15 wt. % catalyst.

4. The method for producing graphite materials according to claim 1, wherein the calcinated and doped coke from step b) contains a maximum of 15 wt. % catalyst.

5. The method for producing graphite materials according to claim 1, wherein during the production of the green body in step e), the doped and calcinated coke has a grain size larger than 100 μm.

6. The method for producing graphite materials according to claim 1, wherein in the event of shaped body graphitisation, the graphitisation in step f) is the Castner method and, in the event of powder graphitisation, it is continuous powder graphitisation.

7. The method for producing graphite materials according to claim 1, wherein the powder from step d) is additionally mixed with less than 50 wt. % natural graphite prior to shaping.

8. The method for producing graphite materials according to claim 1, wherein the binder used for producing the shaped green body in step e) is selected from the group comprising coal tar pitch, bitumen, phenolic resin, furan resin, or any desired mixtures thereof.

9. The method for producing graphite materials according to claim 8, wherein the additional catalyst is selected from at least one compound of oxides and carbides from the group including the elements iron, nickel, titanium, silicon, and boron and constitutes, based on the binder portion, a maximum of 15 wt. %.

10. The method for producing graphite materials according to claim 1, wherein a catalyst is additionally mixed into the binder used in step d).

11. The method for producing graphite materials according to claim 10, wherein the additional catalyst is selected from at least one compound of oxides and carbides from the group including the elements iron, nickel, titanium, silicon, and boron and constitutes, based on the binder portion, a maximum of 15 wt. %.

12. The method for producing graphite materials according to claim 1, wherein following graphitisation, the graphite material has a specific discharge capacity of from 345 to 365 mAh/g.

13. A method for producing anode material in lithium ion batteries comprising producing a graphite material according to claim 1 and processing the graphite material into a lithium ion battery.

* * * * *